(12) United States Patent
Ronning et al.

(10) Patent No.: US 11,186,181 B2
(45) Date of Patent: Nov. 30, 2021

(54) DRIVE SYSTEM AND METHOD FOR VEHICLE EMPLOYING MULTIPLE ELECTRONIC MOTORS

(71) Applicant: American Axle & Manufacturing, Inc., Detroit, MI (US)

(72) Inventors: Jeffrey J. Ronning, Grosse Pointe Farms, MI (US); John Morgante, Sterling Heights, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 16/865,912

(22) Filed: May 4, 2020

(65) Prior Publication Data

US 2020/0262299 A1    Aug. 20, 2020

Related U.S. Application Data

(63) Continuation of application No. 16/054,481, filed on Aug. 3, 2018, now Pat. No. 10,675,984.

(51) Int. Cl.
| | |
|---|---|
| *H02P 6/04* | (2016.01) |
| *B60L 15/20* | (2006.01) |
| *B60K 1/02* | (2006.01) |
| *B60K 17/356* | (2006.01) |
| *B60L 1/02* | (2006.01) |

(52) U.S. Cl.
CPC ............... *B60L 15/20* (2013.01); *B60K 1/02* (2013.01); *B60K 17/356* (2013.01); *B60L 1/02* (2013.01); *H02P 6/04* (2013.01); *B60L 2220/12* (2013.01); *B60L 2220/14* (2013.01); *B60L 2240/421* (2013.01); *B60L 2240/423* (2013.01); *B60L 2240/486* (2013.01); *B60L 2260/26* (2013.01)

(58) Field of Classification Search
CPC .................................. B60L 15/20; B60K 1/02
USPC ...................................................... 318/400.11
See application file for complete search history.

(56) References Cited

U.S. PATENT DOCUMENTS

| | | | |
|---|---|---|---|
| 5,289,890 A | 3/1994 | Toyoda et al. | |
| 5,549,172 A | 8/1996 | Mutoh et al. | |

(Continued)

FOREIGN PATENT DOCUMENTS

| | | |
|---|---|---|
| DE | 102011004191 A1 | 8/2012 |
| DE | 102011056048 | 6/2013 |

(Continued)

*Primary Examiner* — Erick D Glass
(74) *Attorney, Agent, or Firm* — Burris Law, PLLC

(57) ABSTRACT

A drive system with one or more electrically driven axles, a transmission subsystem, which is drivingly coupled to the drive gearbox of each of the electrically driven axles, synchronous and asynchronous motors, which are each drivingly coupled to the transmission subsystem, and a controller. Each of the axles has a drive gearbox that transmits rotary power to an associated set of vehicle wheels. The controller controls the synchronous motor and/or the asynchronous motor responsive to at least a torque request and a shaft speed of the synchronous motor and/or the shaft speed of the asynchronous motor. Over a significant portion of the operating range of the drive system, the controller is configured to vary the respective magnitudes of the rotary power provided by the motors to satisfy the torque request in a manner that maximizes a combined efficiency of the motors in a predetermined manner.

33 Claims, 7 Drawing Sheets

(56) References Cited

U.S. PATENT DOCUMENTS

| | | | |
|---|---|---|---|
| 8,195,348 B2 | 6/2012 | Mizutani et al. | |
| 9,221,326 B2 | 12/2015 | Steffen et al. | |
| 9,260,105 B2 * | 2/2016 | Tolkacz | B60W 20/10 |
| 9,457,658 B2 | 10/2016 | Knoblauch | |
| 9,789,871 B1 * | 10/2017 | Dlala | B60W 10/14 |
| 9,800,182 B2 | 10/2017 | Zhou et al. | |
| 2010/0025131 A1 | 2/2010 | Gloceri et al. | |
| 2010/0152940 A1 | 6/2010 | Mitsutani et al. | |
| 2011/0213518 A1 | 9/2011 | Welchko et al. | |
| 2015/0303858 A1 * | 10/2015 | Katsumata | B60L 15/2081 318/139 |
| 2016/0264019 A1 | 9/2016 | Drako | |
| 2017/0366112 A1 | 12/2017 | Zhou et al. | |
| 2019/0344776 A1 * | 11/2019 | Bidarvatan | B60W 20/13 |
| 2020/0266731 A1 | 8/2020 | Zhou et al. | |

FOREIGN PATENT DOCUMENTS

| | | |
|---|---|---|
| EP | 2503683 | 9/2012 |
| GB | 2472297 | 2/2011 |

* cited by examiner

DRIVE SYSTEM AND METHOD FOR VEHICLE EMPLOYING MULTIPLE ELECTRONIC MOTORS

CROSS-REFERENCE TO RELATED APPLICATIONS

This application is a continuation of U.S. application Ser. No. 16/054,481 filed Aug. 3, 2018, the disclosure of which is incorporated by reference as if fully set forth in detail herein.

FIELD

The present disclosure relates to electric drive systems used in electrically driven motor vehicles, and more particularly to an electric drive system and method for controlling a plurality of electronic drive units to optimize an operating characteristic of the electric drive system.

BACKGROUND

This section provides background information related to the present disclosure which is not necessarily prior art.

The use of electric drive units ("EDUs") in passenger vehicles is gaining rapidly in popularity, owing in part to the increasing interest in reducing the carbon footprint associated with typical four wheeled passenger vehicles, which traditionally have used internal combustion engines for power. In previously developed EDUs, either an induction motor or a permanent magnet ("PM") motor have most typically been used when either supplementing, or supplanting, an internal combustion engine of a vehicle. Induction motors generally provide maximum efficiency at moderate to high rotational speeds and lower output shaft torques. Conversely, a PM motor differs in that its peak efficiency generally occurs at lower to moderate motor shaft speeds, and over a wider output torque range, than an induction motor. FIGS. 1 and 2 provide graphs illustrating how the efficiency of each of a PM motor and an induction motor change with speed and output torque.

With the present day interest in maximizing efficiency and obtaining the maximum driving range of vehicles having an EDU, there is strong focus on developing EDUs that even better meet the needs of maximizing efficiency while providing maximum efficiency over a wider speed range, as well as over a wider output torque range.

SUMMARY

This section provides a general summary of the disclosure and is not a comprehensive disclosure of its full scope or all of its features.

In one aspect the present disclosure relates to a drive system for a vehicle. The system may comprise an electronic drive unit (EDU) subsystem including at least one synchronous motor and at least one asynchronous motor, controllable independently from one another. An electronic controller may be included which is responsive to a torque request input signal and configured to control the EDU subsystem. A memory may also be included which is associated with the electronic controller. The memory may be configured to store at least one blending map containing information on percentage outputs from the synchronous and asynchronous motors. The electronic controller may use the blending map to select, in response to different torque request input signals, specific percentage outputs for each of the motors to optimize a characteristic of the EDU subsystem.

In another aspect the present disclosure relates to a drive system for a vehicle. The drive system may comprise an electronic drive unit (EDU) subsystem. The electronic drive system may include a synchronous motor; a first inverter operably associated with the synchronous motor for controlling the synchronous motor; an asynchronous motor; and a second inverter operably associated with the asynchronous motor for controlling the asynchronous motor. The electronic drive system may further include an electronic controller responsive to a torque request input signal and configured to control the EDU subsystem. A transmission subsystem may also be included which has a front axle and a rear axle. Each of the front and rear axles may be responsive to output signals from the EDU subsystem. The electronic drive system may further include a memory in communication with the electronic controller and configured to store at least one blending map containing information on percentage outputs from the synchronous and asynchronous motors. The blending map may be accessible and used by the electronic controller to select, in response to different torque request input signals, specific percentage outputs from each motor to optimize a characteristic of the EDU subsystem.

In still another aspect the present disclosure relates to a method for forming a drive system for a vehicle. The method may comprise using an electronic drive unit (EDU) subsystem including a first electric motor and a second electric motor to drive a transmission subsystem of the vehicle, where the first and second electric motors have differing operating characteristics. The method may further include controlling the first and second electric motors such that outputs from each are used simultaneously, with a predetermined percentage of output of each motor, to drive the transmission subsystem of the vehicle.

In yet another form, the present teachings provide a drive system for a vehicle. The drive system includes one or more electrically driven axles, a transmission subsystem, a synchronous motor, an asynchronous motor, and an electronic controller. Each of the one or more electrically driven axles has a drive gearbox that is configured to transmit rotary power to an associated set of vehicle wheels to propel the vehicle. The transmission subsystem is drivingly coupled to the drive gearbox of each of the electrically driven axles. The synchronous motor and the asynchronous motor are each drivingly coupled to the transmission subsystem. The electronic controller has a memory with a map containing information for controlling at least one of the synchronous and asynchronous motors responsive to at least a torque request and a shaft speed of the at least one of the synchronous and asynchronous motors. Over at least a substantial portion of the operating range of the drive system, the electronic controller is configured to control the synchronous and asynchronous motors to generate respective portions of rotary power that combine to satisfy the torque request while the synchronous and asynchronous motors are operated with a combined efficiency that is greater than the combined efficiency of the synchronous and asynchronous motors when they are controlled in another manner in which the magnitudes of the respective portions of the rotary power that are provided by the synchronous and asynchronous motors are different.

In still another form, the present disclosure provides a method for forming a drive system for a vehicle. The method includes: providing an electronic drive unit (EDU) subsystem including a first electric motor, a second electric motor and a transmission subsystem, the first and second electric motors having differing operating characteristics; and controlling the first and second electric motors to output rotary power simultaneously to the transmission subsystem, wherein the first electric motor and the second electric motor are controlled to output a predetermined first portion and a predetermined second portion, respectively, of the rotary power that is transmitted to the transmission subsystem to drive at least one axle of the vehicle. Controlling the first and second electric motors includes using a map stored in a memory that permits a controller to determine the first portion of the rotary power that is to be provided by the first electric motor based upon a torque request signal. Over at least a substantial portion of an operating range of the drive system, the first and second motors are controlled to generate respective portions of rotary power that combine to satisfy the torque request while the first and second motors are operated with a combined efficiency that is greater than the combined efficiency of the first motor and the second motor when the first motor and the second motor are controlled in another manner in which the magnitudes of the respective portions of the rotary power that are provided by the first and second motors are different.

In another form, the present disclosure provides a drive system for a vehicle. The drive system includes a synchronous motor having a first motor output, an asynchronous motor having a second motor output, a gearbox unit, a transmission and an electronic controller. The gearbox unit is configured to transmit rotary power to a pair of vehicle wheels. The transmission is drivingly coupled to the first and second motor outputs and is configured to transmit rotary power from the synchronous and asynchronous motors to the gearbox unit. The electronic controller is configured to control at least one of the synchronous and asynchronous motors responsive to a torque request such that each of the synchronous motor and the asynchronous motor produce rotary power with a respective magnitude such that the combined rotary power produced by the synchronous motor and the asynchronous motor satisfies the torque request. Over a significant portion of the operating range of the drive system, the controller is configured to vary the respective magnitudes of the rotary power provided by the synchronous and asynchronous motors to satisfy the torque request in a manner that maximizes a combined efficiency of the synchronous and asynchronous motors in a predetermined manner.

In a further form, the present disclosure provides a drive system for a vehicle. The drive system includes a synchronous motor having a first motor output, an asynchronous motor having a second motor output, a first gearbox unit driven by the synchronous motor, a second gearbox unit driven by the asynchronous motor, and an electronic controller. The first gearbox unit is configured to transmit rotary power to a first pair of vehicle wheels, while the second gearbox unit is configured to transmit rotary power to a second pair of vehicle wheels. The electronic controller is configured to control at least one of the synchronous and asynchronous motors responsive to a torque request such that each of the synchronous motor and the asynchronous motor produce rotary power with a respective magnitude such that the combined rotary power produced by the synchronous motor and the asynchronous motor satisfies the torque request. Over a significant portion of the operating range of the drive system, the controller is configured to vary the respective magnitudes of the rotary power provided by the synchronous and asynchronous motors to satisfy the torque request in a manner that maximizes a combined efficiency of the synchronous and asynchronous motors in a predetermined manner.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 3:
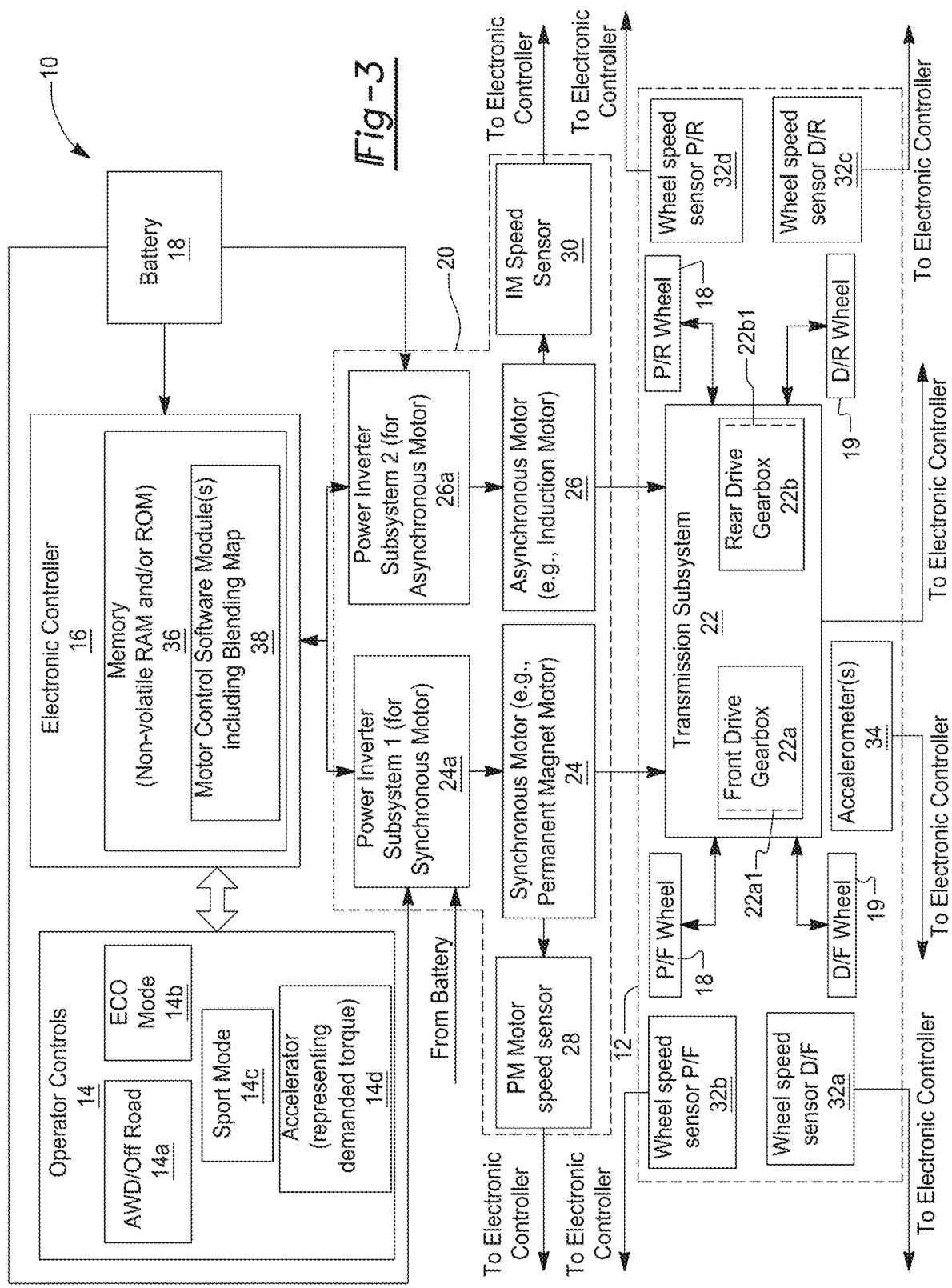
Figure 4:
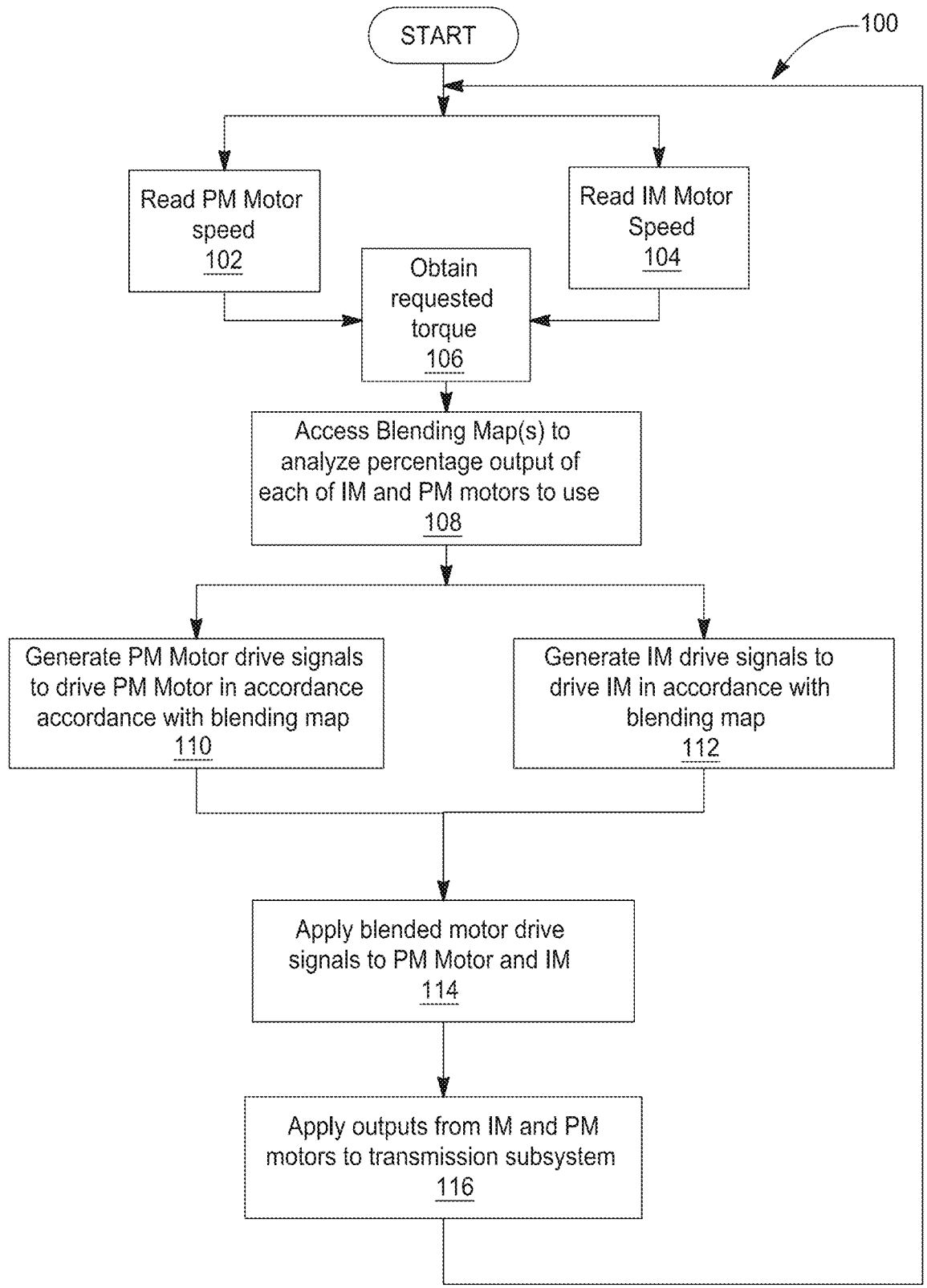
Figure 5:
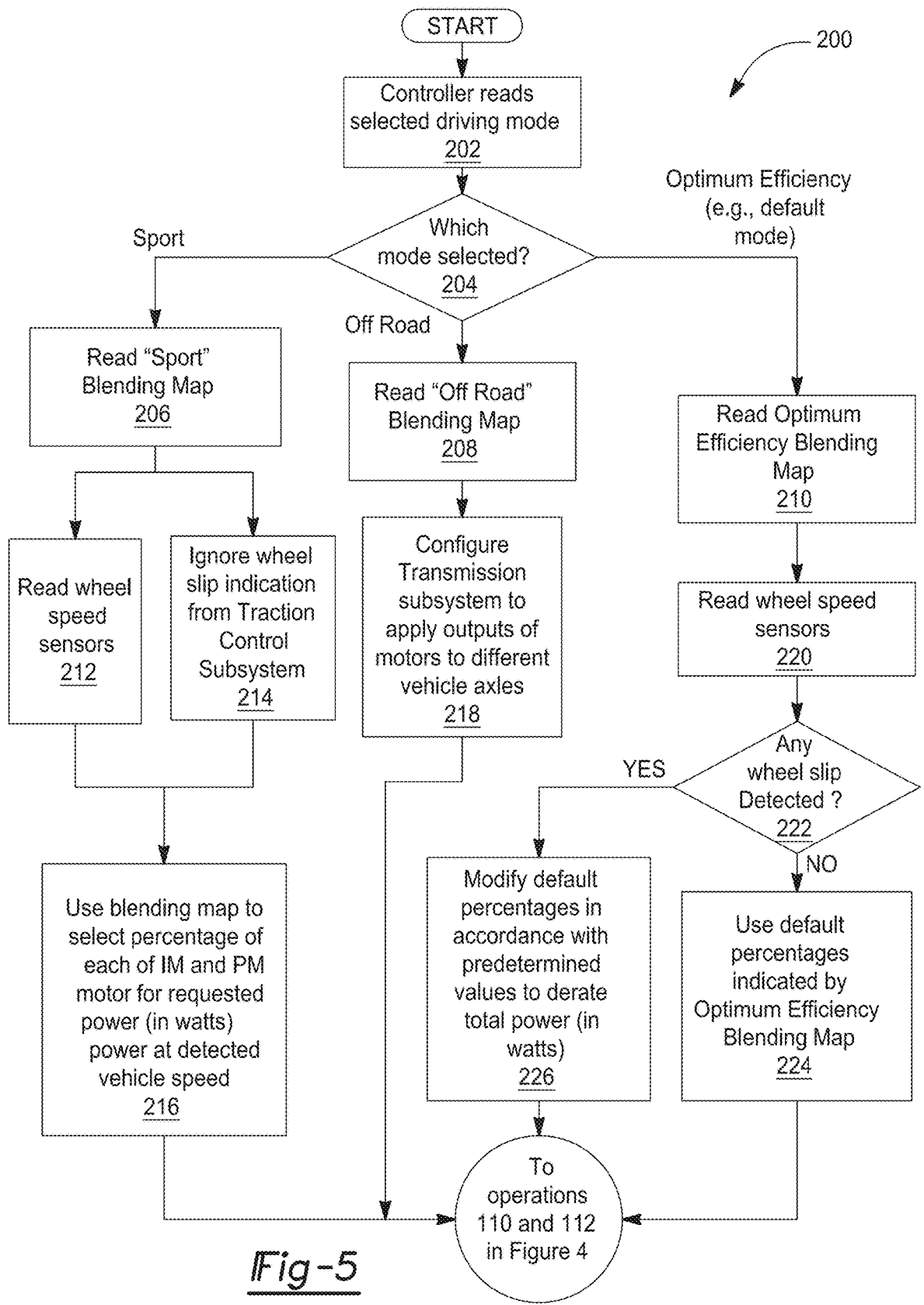
Figure 6:
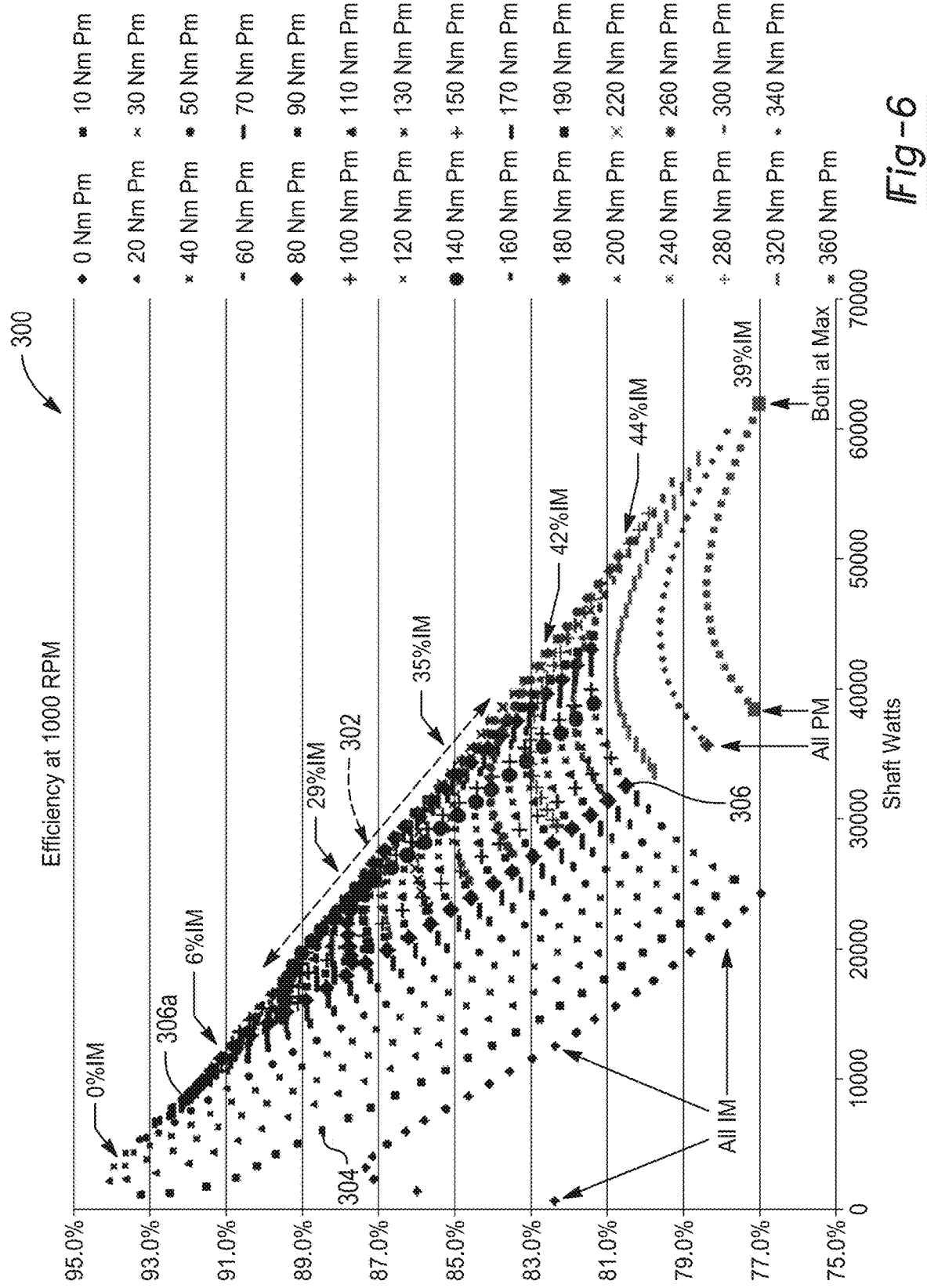
Figure 7:

FIG. 3 is a high level block diagram of one embodiment of a system in accordance with the present disclosure which makes use of a pair of electric drive units, where one includes a synchronous motor and the other includes an asynchronous motor, and both motors in this example are controlled in accordance with at least one "blending" map which controls the percentage output of each an amount of motor to achieve a desired performance characteristic, which in one example is maximum efficiency;

FIG. 4 is a high-level flowchart of operation of the system shown in FIG. 3;

FIG. 5 is a high-level flowchart illustrating in greater detail one example of the operations that may be performed when accessing the blending map(s) in FIG. 4;

FIG. 6 is one example of an "Efficiency" blending map that may be used by the electronic controller in determining a percentage output of each one of the synchronous and asynchronous motors for a given torque request signal; and FIG. 7 is one example of a "Sport" mode blending map that may be used in controlling the percentage of the total torque output to a designated one (e.g., rear) of the two motors.

Corresponding reference numerals indicate corresponding parts throughout the several views of the drawings.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 3, a drive system 10 in accordance with one embodiment of the present disclosure is shown. The drive system 10 shown in this example is implemented in connection with a four wheeled passenger vehicle 12, although it is not limited to traditional passenger vehicles. The system 10 is equally applicable to commercial vehicles such as trucks, and may also find utility in other applications, for example in connection with farm equipment, earth moving equipment, marine vessels and possibly even aircraft.

The drive system 10 broadly includes a group of operator controls 14, an electronic controller 16, a battery 18 for powering various electrical components of the system 10, an EDU subsystem 20 controlled by the electronic controller 16, and a transmission subsystem 22 driven by the EDU subsystem for providing motive force to wheels 19 of the vehicle 12. In this example the transmission subsystem 22 forms an all-wheel drive subsystem and has a front drive gearbox 22a, which drives a front axle 22a1, and an independent rear drive gearbox 22b which is used to independently drive a rear axle 22b. However, it will be appreciated that the vehicle 12 may instead have a two wheel drive subsystem, in which case only a single drive gearbox will be needed, and in that embodiment the EDU subsystem 20 will use the single drive gearbox to drive only two wheels 19 of the vehicle rather than all four wheels. Both embodiments are contemplated by the present disclosure.

The operator controls 14 may include, without limitation, an "All-Wheel Drive" ("AWD") or off-road control 14a, an "Economy" ("ECO") or maximum efficiency control 14b, a "Sport Mode" control 14c and an accelerator pedal 14d. The accelerator pedal 14d enables the vehicle operator to generate a torque request signal, which represents a "demanded" torque output from the EDU subsystem 20. It will be appreciated, however, that for an autonomous (i.e., self-driving) vehicle, no accelerator pedal would typically be present. In that case, the torque request signal may be generated by the electronic controller 16 or by a different subsystem of the vehicle. Therefore, it will be appreciated that the drive system 10 is equally applicable to implementation on autonomous vehicles.

The EDU subsystem 20 includes both a synchronous motor 24, for example a switched reluctance motor or a Permanent Magnet motor 24, as well as an asynchronous motor 26, for example an induction motor. Merely for convenience, the permanent magnet motor 24 and the asynchronous motor 26 will be referred to throughout the following discussion as "PM motor 24" and "induction motor 26", respectively.

The PM motor 24 has its own power inverter 24a for controlling the PM motor, while the induction motor likewise has its own power inverter 26a for controlling the induction motor. Each of the PM motor 24 and the induction motor 26 may be used alone or simultaneously together to drive the front drive gearbox 22a and/or the rear drive gearbox 22b of the transmission subsystem 22. In one configuration both of the PM motor 24 and the induction motor 26 simultaneously provide torque, through the transmission subsystem 22, to drive both of the front drive gearbox 22a and the rear drive gearbox 22b, while in another configuration the PM motor 24 may be used to drive one of the drive gearboxes 22a or 22b (e.g., the front axle 22a1 associated with the front drive gearbox 22a) while the induction motor is used to drive the other drive gearbox (e.g., the rear axle 22b1 associated with the rear drive gearbox 22b), or vice versa. In one embodiment the PM motor 24 and the induction motor 26 may provide the same power output, while in other embodiments the power outputs of the two motors could be different. For example, for a sports car with an all-wheel drive transmission subsystem, the power output from the motor 24 or 26 selected to drive the rear wheels could be selected to have a higher power output from the wheels. Conversely, for a sedan or off-road type vehicle, the motor 24 or 26 selected to drive the front wheels could be selected to have a higher power output. Accordingly, the motors 24 and 26 could be selected to have different power levels to best suit the anticipated requirements of the vehicle. With continued reference to FIG. 3, the EDU subsystem 20 may also include a PM motor speed sensor 28 to sense the speed of the PM motor 24, while an induction motor (IM) speed sensor 30 may be used to sense the speed of the induction motor 26. Both of the sensors 28 and 30 may supply their signals to the electronic controller 16 or to other subsystems of the drive system 10 if needed.

Each wheel 19 of the vehicle 12 may also include a wheel speed sensor 32a-32d, for detecting a real time speed of each wheel during operation of the vehicle 12. The wheel speed sensors 32a-32d may each supply a real time signal to the electronic controller 16 which the electronic controller may use to help control the EDU drive subsystem 20. Optionally, one or more accelerometers 34 may be included on the vehicle 12 to provide real time acceleration signals to the electronic controller 16.

The electronic controller 16 may include a memory (e.g., non-volatile memory) 36, which may be RAM, ROM, DRAM, etc. The memory 36 may be used to store one or more blending maps 38 for use by the electronic controller in controlling the PM motor 24 and the induction motor 26 to achieve a desired performance (e.g., maximum efficiency, "sport" mode operation or off-road operation).

Referring to FIG. 4, a flowchart 100 is shown illustrating various operations that may be performed by the drive system 10 of FIG. 3. Initially, the PM motor speed is read by the electronic controller 16 using the PM motor speed sensor 28 at operation 102. Virtually simultaneously, the electronic controller 16 reads the induction motor speed via the IM speed sensor 30, at operation 104. The electronic controller 16 then may obtain the requested torque, which is represented by the accelerator pedal 14d position, as indicated at operation 106.

At operation 108 the electronic controller 16 accesses the appropriate, stored blending map(s) 38 in software, to determine the percentage of each of the PM motor 24 and the induction motor 26 to use in generating a combined (i.e., composite) output control signal. At operations 110 and 112, the PM power inverter 24a and the induction motor power inverter 26a use the output control signals to control the PM motor 24 and the induction motor 26 as needed to generate the desired percentage output from each motor. The desired percentage output is that precise percentage output from each motor in accordance with the specific blending map (i.e., Efficiency, Sport or Off-Road) that is being accessed (i.e., which has been selected by the operator). The drive signals from the PM motor 24 and the induction motor 26 are then applied to the transmission subsystem 22, at operation 116, and used to independently drive the axles 22a1 and 22b1 associated with the independent drive gear boxes 22a and 22b, respectively. Optionally, as noted above, the outputs from the PM motor 24 and the induction motor 26 may be used to together to drive a single gearbox, if the vehicle uses a two-wheel drive transmission subsystem.

As the vehicle 12 travels, the wheel speed sensors 32a-32d may be used to independently monitor the speed of each wheel 19. Outputs from the wheel speed sensors 32a-32d may be used to further adjust the outputs from the PM motor 24 and the induction motor 26, if needed, and depending on the operating mode (i.e., Efficiency, Sport or Off-road) that the operator has selected for the vehicle 12. After operations 116 and 118 are performed, then at the next clock cycle of the electronic controller 16 (e.g., a set number of milliseconds later) operations 102-118 are repeated to update the outputs from the PM motor 24 and the induction motor 26.

Referring now to FIG. 5, a more detailed flowchart 200 is shown presenting one specific example as to how various operations may be performed by the electronic controller 16 in controlling the EDU subsystem 20. The flowchart 200 expands on various operations that may be performed at operation 108 in FIG. 4.

Initially at operation 202, the electronic controller 16 reads the driving mode selected by the operator and. At operation 204 the electronic controller 16 determines which one of, in this example, the three distinct operating modes have been selected. If the Sport mode has been selected, then the electronic controller reads the sport mode blending map 206. If the Off-Road mode has been selected, then the Off-Road blending map is read at operation 208. If the Efficiency mode has been selected, then the Efficiency blending map is read at operation 210. In this example the Efficiency mode has been pre-programmed as the "default" mode. If the operator does not make a selection via any one of the mode controls 14*a*, 14*b* or 14*c*, then the electronic controller 16 will automatically use the Efficiency mode to control the EDU subsystem 20.

If the Sport mode blending map has been read at operation 204, then the electronic controller 16 may read the wheel speed sensors 32*a*-32*d*, as indicated at operation 212, and optionally may ignore the wheel slip occurring at any of the wheels 19 of the vehicle 12, as indicated at operation 214. At operation 216 the electronic controller 16 may use the Sport mode blending map to obtain a percentage output from each of the PM motor 24 and the induction motor 26 to apply to a selected torque. In this instance, where the delivery of the selected torque (in shaft watts output) may necessitate using percentages of one or both motors 24 and 26 that provide well less than maximum efficiency. As a further example, the transmission subsystem 22 may be controlled so that when in the Sport mode, and during a partial pedal position of the accelerator pedal 14*d*, the load is biased towards whichever motor powers the rear axle 22*b*1. As an extreme case, at roughly 50% accelerator pedal 14*d* position, the motor 24 or 26 driving the rear axle 22*b*1 could be at full output and the other motor powering the front axle 22*a*1 could be at a very low output level, for example putting out almost no torque. More likely, however, it is anticipated that a smooth blend-in from possibly about 30% accelerator pedal 14*d* position to about 70% accelerator pedal position may be preferred when increasing the bias of torque being applied to the rear axle 22*b*1.

One example of the Sport mode blending map is shown in FIG. 7. The percentages shown in FIG. 7 may be used for each of the PM motor 24 and the induction motor 26 when controlling the EDU subsystem 20 to provide outputs to the motors 24 and 26 while the Sport mode is in use. It will also be noted in the Sport mode, the percentage of the total torque being applied by the rear motor (e.g., the induction motor 26 in this example) varies with both the total torque being demanded as well as the motor RPM. As motor RPM goes up, the maximum of 100% torque from the rear motor (e.g., the induction motor 26) is reached sooner.

If the Off-road mode has been selected, the Off-Road mode blending map will be read by the electronic controller 16 at operation 208, and the EDU subsystem 20 will be controlled so that torque is applied evenly through the separate front and rear drive gearboxes 22*a* and 22*b* to the front axle 22*a*1 and the rear axle 22*b*1, respectively, of the vehicle simultaneously. In this mode the wheel speed sensors 32*a*-32*d* may optionally be ignored as well. The transmission subsystem 22 may be electronically configured such that the full output of one motor, for example the PM motor 24, is applied to one axle 22*a*1 or 22*b*1, for example the front axle 22*a*1 of the vehicle, while the induction motor 26 applies its output to the rear axle 22*b*1, as indicated at operation 218. If the Efficiency mode has been selected, or if the user has not selected a mode after initially starting the vehicle 12, then in this example the Efficiency mode will automatically be used by the electronic controller 16. At operation 210 the electronic controller 16 will read the Efficiency mode blending map, then optionally may read the wheel speed sensors 32*a*-32*d* at operation 220, and make a check to detect if there is any wheel slip occurring with any of the wheels 19, as indicated at operation 222. If no wheel slip is occurring, then the percentages provide in the Efficiency blending map may be used, as indicated at operation 224, by the electronic controller 16. If some wheel slip has been detected at operation 222, then at operation 226 the controller 16 may de-rate or modify the percentages called for in the Efficiency blending map to momentarily reduce the total shaft output (in watts) being provided by both motors. Alternatively, the electronic controller 16 may de-rate the percentage used of one or the other of the PM motor 24 and the induction motor 26. Derating of a slipping axle may be offset by added equivalent thrust at the other axle for a net zero change in acceleration.

FIG. 6 shows one example of graphs illustrating an Efficiency blending map 300. In this example the Efficiency mode blending map 300 shows how efficiency for each of the PM motor 24 and the induction motor 26 changes for various torque outputs. Dashed line 302 in this example provides an optimum "composite" efficiency. The leftmost end of each curve indicates 0% of the induction motor 26 is being used, while the far-right end of each curve indicates 100% of the induction motor output being used. For example, in looking at the 10 Nm curve 304, optimum efficiency of just over 93.0% occurs at 1000 motor speed by using essentially only the output of the PM motor 24 and no output of the induction motor 26. That operating point represents the best way to make that particular shaft power, around 1 kW. No other point on any other curve provides higher overall efficiency than that point at 1 kW. If the total shaft output demand is about 10 kW, then there are other curves with better overall motoring efficiency. The diamonds 306 represent 80 Nm of PM motor output and there are points on that curve near 10 kW total combined shaft power (i.e., the output power being generated from the output shafts of both motors 24 and 26) that reside at the leading edge of efficiency. The particular point (point 306*a*) with best efficiency produces over 91% efficiency and corresponds to a blend of about 6% induction motor torque (94% PM motor torque). As the requirement for more shaft power increases (i.e., along the X axis), it can be seen that the leading edge of efficiency is represented by a stronger blend of the outputs of the two motors 24 and 26, reaching as high as 44% of the combined torque coming from the induction motor 26 near 50 kW shaft power. It can be seen below the leading edge of efficiency that there are several suboptimal torque blend combinations that would produce lower overall efficiency. There is typically only one blend combination for each shaft power requirement that produces the best efficiency.

Figure 1:
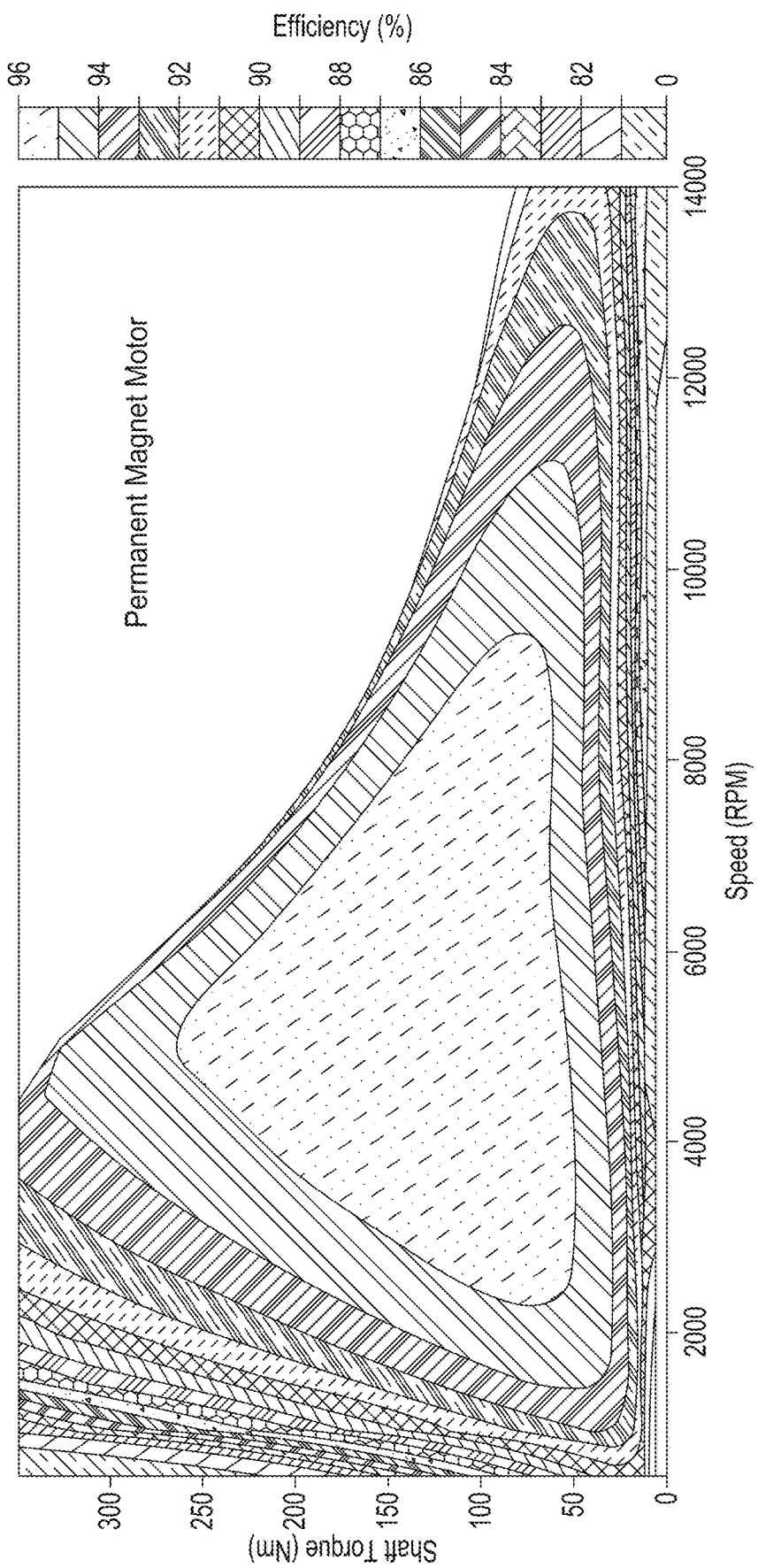
FIG. 1 is a graph of a prior art permanent magnet motor illustrating how its efficiency changes relative to shaft speed and shaft (i.e., output) torque.
Figure 2:
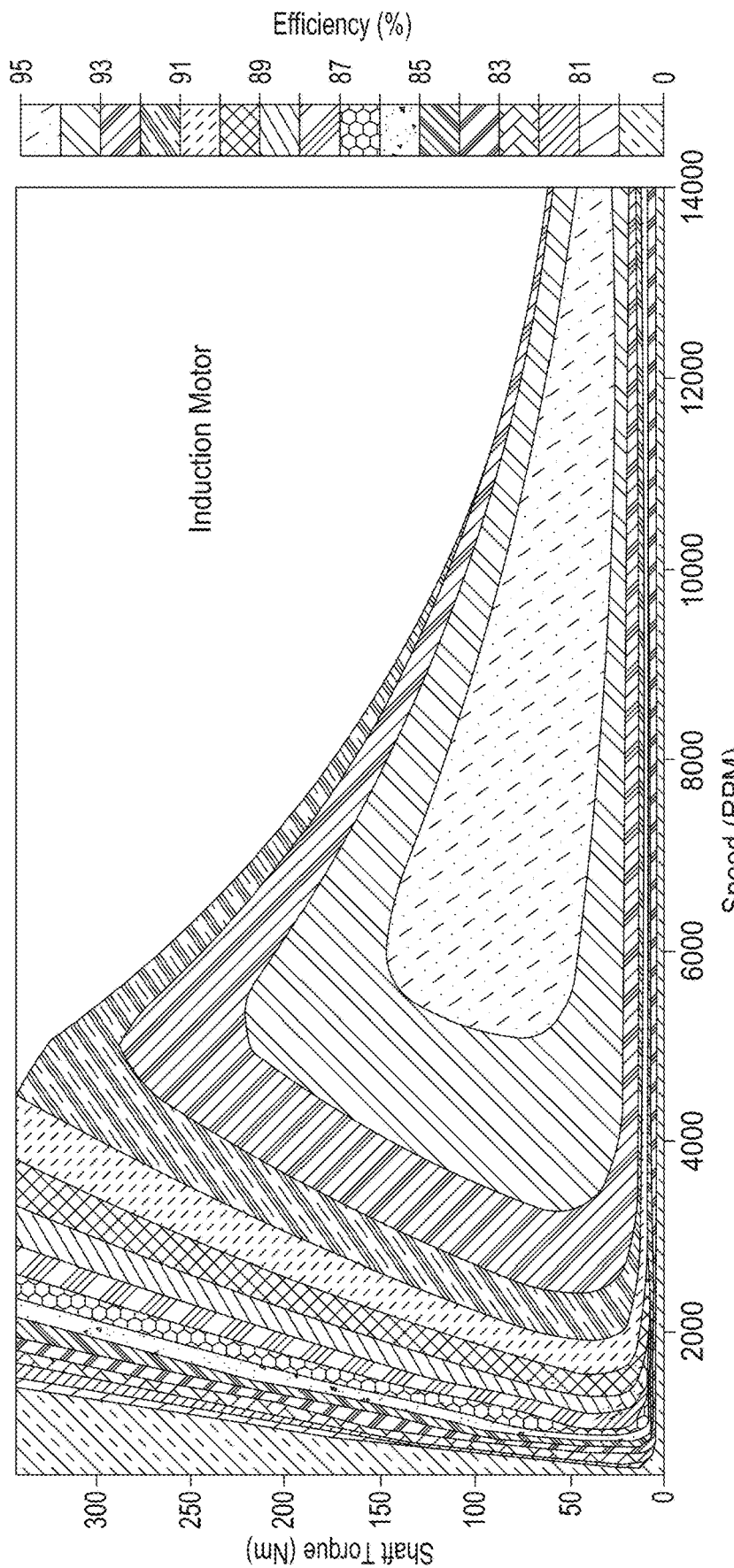
FIG. 2 is a graph of a prior art induction motor showing how its efficiency changes relative to shaft speed and shaft output torque.

The system 10 further provides the advantage that the PM motor 24 is a synchronous machine, while the induction motor 26 is an asynchronous machine with different efficiency characteristics. The use of two different types of electric motors simultaneously, enables the elimination of a 2-speed gearbox, that is, the motors can be controlled such that one is predominantly used where low speed and high torque is needed, and then the percentage output of altered for use at higher vehicle speeds during cruise conditions, where torque requirements may be lower, but where efficiency may be more of a concern. The system 10 and method of the present disclosure thus is able to optimize the use of the PM motor 24 and the induction motor 26 to meet the changing speed/torque needs in a manner that maximizes the efficient use of both motors. It will also be appreciated that while the system 10 has been described in connection with one synchronous motor and one asynchronous motor, that the present disclosure is not limited to using only one of each type of motor. For example, two synchronous motors (e.g., two PM motors 24) may be used to drive one pair of wheels 19 of the vehicle 12, or two asynchronous motors (e.g., two induction motors 26) may be used to drive one pair of wheels. Alternatively, one motor of one type may be used to drive the front axle of the vehicle and two motors of the other type may be used to drive the other axle. Accordingly, the system 10 is not limited to only the motor configuration shown in FIG. 1, but it is anticipated that the system 10 may be modified, while staying within the scope of the present disclosure, as needed to best suit a specific application.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A drive system for a vehicle, comprising:
   one or more electrically driven axles, each of the one or more electrically driven axles having a drive gearbox that is adapted to transmit rotary power to an associated set of vehicle wheels to propel the vehicle;
   a transmission subsystem drivingly coupled to the drive gearbox of each of the electrically driven axles;
   a synchronous motor that is drivingly coupled to the transmission subsystem;
   an asynchronous motor that is drivingly coupled to the transmission subsystem; and
   an electronic controller configured to control the synchronous and asynchronous motors to satisfy a torque request, the electronic controller having a memory with a plurality of first blending maps or look-up tables, the first blending maps or look-up tables each being associated with a different magnitude of a speed parameter that is related to a speed of the vehicle, each of the first blending maps or look-up tables being configured to determine fractional portions of the torque request to be produced by the synchronous and asynchronous motors that are based on a magnitude of the torque request.

2. The drive system of claim 1, wherein the synchronous motor comprises a permanent magnet (PM) motor.

3. The drive system of claim 1, wherein the synchronous motor comprises a switched reluctance motor.

4. The drive system of claim 1, wherein the asynchronous motor comprises an induction motor.

5. The drive system of claim 1, further comprising a first power inverter that is independently associated with the synchronous motor, the first power inverter being configured to power the synchronous motor responsive to the control of the controller.

6. The drive system of claim 5, further comprising a second power inverter that is independently associated with the asynchronous motor, the second power inverter being configured to control the asynchronous motor responsive to the control of the controller.

7. The drive system of claim 1, wherein the synchronous motor and the asynchronous motor provide rotary power through the transmission subsystem to a single drive gearbox such that the synchronous and asynchronous motors are operable for selectively driving a common set of vehicle wheels.

8. The drive system of claim 1, wherein the transmission subsystem drivingly couples both the synchronous and asynchronous motors to a common drive gearbox.

9. The drive system of claim 1, wherein the transmission subsystem drivingly couples the synchronous motor to a first drive gearbox and drivingly couples the asynchronous motor to a second drive gearbox.

10. The drive system of claim 1, wherein over at least a substantial portion of the operating range of the drive system, the first blending maps or look-up tables are configured to vary the respective magnitudes of the fractional portions of the torque request to be produced by the synchronous and asynchronous motors to satisfy the torque request in a manner that maximizes a combined efficiency of the synchronous and asynchronous motors in a predetermined manner.

11. The drive system of claim 10, wherein the at least a substantial portion of the operating range of the drive system includes a majority of the operating range of the drive system.

12. The drive system of claim 1, wherein the controller is operable in a first alternate mode in which the controller employs a plurality of second blending maps or look-up tables that are different from the first blending maps or look-up tables, the second blending maps or look-up tables each being associated with a different magnitude of the speed parameter, each of the second blending maps or look-up tables being configured to determine first alternate fractional portions of the torque request based on the magnitude of the torque request, wherein the first alternate fractional portions of the torque request are to be produced by the synchronous and asynchronous motors to satisfy the torque request when the controller is operated in the first alternate mode.

13. The drive system of claim 12, wherein the second blending maps or look-up tables are configured to direct one of the synchronous motor and the asynchronous motor to produce rotary power at a level below the torque request threshold when the magnitude of the torque request is greater than the torque request threshold, and
   wherein at least a portion of the second blending maps or look-up tables is configured to progressively phase in power to the other one of the synchronous motor and the asynchronous motors to produce rotary power to satisfy the torque request when the magnitude of the torque request is above the torque request threshold, and wherein progressively phasing in power to the other one of the synchronous motor and the asynchronous motor comprises increasing a ratio at which the other one of the synchronous motor and the asynchronous motor contributes rotary power to satisfy the torque request.

14. The drive system of claim 12, wherein at least a portion of the second blending maps or look-up tables is configured such that a torque request threshold diminishes in magnitude as a rotational speed of one of the synchronous motor and the asynchronous motor increases.

15. The drive system of claim 12, wherein operation of the controller in the first alternate mode is not affected by a predetermined set of vehicle parameters.

16. The drive system of claim 15, wherein the set of vehicle parameters includes wheel slip.

17. The drive system of claim 15, wherein the set of vehicle parameters includes wheel speed.

18. A drive system for a vehicle, comprising:
one or more electrically driven axles, each of the one or more electrically driven axles having a drive gearbox that is adapted to transmit rotary power to an associated set of vehicle wheels to propel the vehicle;
a transmission subsystem drivingly coupled to the drive gearbox of each of the electrically driven axles;
a synchronous motor that is drivingly coupled to the transmission subsystem;
an asynchronous motor that is drivingly coupled to the transmission subsystem; and
an electronic controller configured to control the synchronous and asynchronous motors to satisfy a torque request, the electronic controller having a memory with a plurality of first blending maps or look-up tables, the first blending maps or look-up tables each being associated with a different magnitude of a speed parameter that is related to a speed of the vehicle, each of the first blending maps or look-up tables being configured to determine a fractional portion of the torque request to be produced by one of the synchronous and asynchronous motors based on a magnitude of the torque request;
wherein over at least a substantial portion of the operating range of the drive system, the first blending maps or look-up tables are configured to vary the respective magnitudes of the fractional portion of the torque request to be produced by the one of the synchronous and asynchronous motors to satisfy the torque request in a manner that maximizes a combined efficiency of the synchronous and asynchronous motors in a predetermined manner.

19. The drive system of claim 18, wherein the at least a substantial portion of the operating range of the drive system includes a majority of the operating range of the drive system.

20. The drive system of claim 18, wherein the synchronous motor comprises a permanent magnet (PM) motor.

21. The drive system of claim 18, wherein the synchronous motor comprises a switched reluctance motor.

22. The drive system of claim 18, wherein the asynchronous motor comprises an induction motor.

23. The drive system of claim 18, further comprising a first power inverter that is independently associated with the synchronous motor, the first power inverter being configured to power the synchronous motor responsive to the control of the controller.

24. The drive system of claim 5, further comprising a second power inverter that is independently associated with the asynchronous motor, the second power inverter being configured to control the asynchronous motor responsive to the control of the controller.

25. The drive system of claim 18, wherein the synchronous motor and the asynchronous motor provide rotary power through the transmission subsystem to a single drive gearbox such that the synchronous and asynchronous motors are operable for selectively driving a common set of vehicle wheels.

26. The drive system of claim 18, wherein the transmission subsystem drivingly couples both the synchronous and asynchronous motors to a common drive gearbox.

27. The drive system of claim 18, wherein the transmission subsystem drivingly couples the synchronous motor to a first drive gearbox and drivingly couples the asynchronous motor to a second drive gearbox.

28. The drive system of claim 18, wherein the controller is operable in a first alternate mode in which the controller employs a plurality of second blending maps or look-up tables that are different from the first blending maps or look-up tables, the second blending maps or look-up tables each being associated with a different magnitude of the speed parameter, each of the second blending maps or look-up tables being configured to determine first alternate fractional portions of the torque request based on the magnitude of the torque request, wherein the first alternate fractional portions of the torque request are to be produced by the synchronous and asynchronous motors to satisfy the torque request when the controller is operated in the first alternate mode.

29. The drive system of claim 28, wherein the second blending maps or look-up tables are configured to direct one of the synchronous motor and the asynchronous motor to produce rotary power at a level below a torque request threshold when the magnitude of the torque request is greater than the torque request threshold, and
wherein at least a portion of the second blending maps or look-up tables is configured to progressively phase in power to the other one of the synchronous motor and the asynchronous motors to produce rotary power to satisfy the torque request when the magnitude of the torque request is above the torque request threshold, and wherein progressively phasing in power to the other one of the synchronous motor and the asynchronous motor comprises increasing a ratio at which the other one of the synchronous motor and the asynchronous motor contributes rotary power to satisfy the torque request.

30. The drive system of claim 28, wherein at least a portion of the second blending maps or look-up tables is configured such that a torque request threshold diminishes in magnitude as a rotational speed of one of the synchronous motor and the asynchronous motor increases.

31. The drive system of claim 28, wherein operation of the controller in the first alternate mode is not affected by a predetermined set of vehicle parameters.

32. The drive system of claim 31, wherein the set of vehicle parameters includes wheel slip.

33. The drive system of claim 31, wherein the set of vehicle parameters includes wheel speed.

* * * * *